United States Patent
Kornilovich

(10) Patent No.: US 8,520,295 B2
(45) Date of Patent: Aug. 27, 2013

(54) REFLECTIVE DISPLAYS

(75) Inventor: Pavel Kornilovich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

(21) Appl. No.: 13/171,403

(22) Filed: Jun. 28, 2011

(65) Prior Publication Data

US 2013/0003161 A1 Jan. 3, 2013

(51) Int. Cl.
- *G02B 26/00* (2006.01)
- *G09G 3/34* (2006.01)
- *G03G 17/04* (2006.01)

(52) U.S. Cl.
USPC .................. 359/296; 345/107; 430/32

(58) Field of Classification Search
USPC ............. 359/296; 345/107, 49, 105; 430/31, 430/32; 204/450, 600; 438/929; 349/33; 250/70, 208.1
See application file for complete search history.

(56) References Cited

U.S. PATENT DOCUMENTS

| | | | |
|---|---|---|---|
| 7,440,159 B2 | 10/2008 | Yang et al. | |
| 2002/0018042 A1* | 2/2002 | Albert et al. | 345/107 |
| 2003/0011869 A1* | 1/2003 | Matsuda et al. | 359/296 |
| 2006/0209009 A1* | 9/2006 | Schlangen et al. | 345/107 |
| 2007/0164983 A1* | 7/2007 | Hamaguchi | 345/107 |
| 2008/0024430 A1 | 1/2008 | Roh | |
| 2008/0110758 A1 | 5/2008 | Weber | |
| 2008/0117165 A1 | 5/2008 | Machida et al. | |
| 2008/0304135 A1 | 12/2008 | Van Delden et al. | |
| 2009/0189849 A1 | 7/2009 | Miyazaki et al. | |
| 2010/0090943 A1 | 4/2010 | Fricke et al. | |
| 2011/0102881 A1 | 5/2011 | Verschueren et al. | |

FOREIGN PATENT DOCUMENTS

WO   WO 02/44706   6/2002

* cited by examiner

*Primary Examiner* — Dawayne A Pinkney

(57) ABSTRACT

A reflective display includes a first transparent substrate and a second transparent substrate. First and second electrodes are connected to each of the first and second transparent substrates, and define a space between the first and second transparent substrates. The geometry of the first and second electrodes creates a substantially uniform electric field when a voltage is applied to the first and second electrodes.

18 Claims, 8 Drawing Sheets

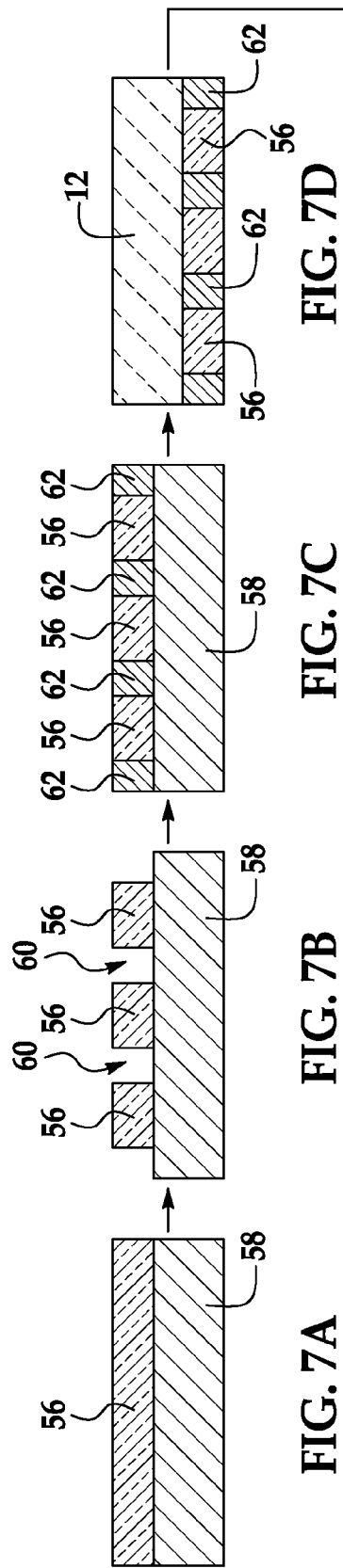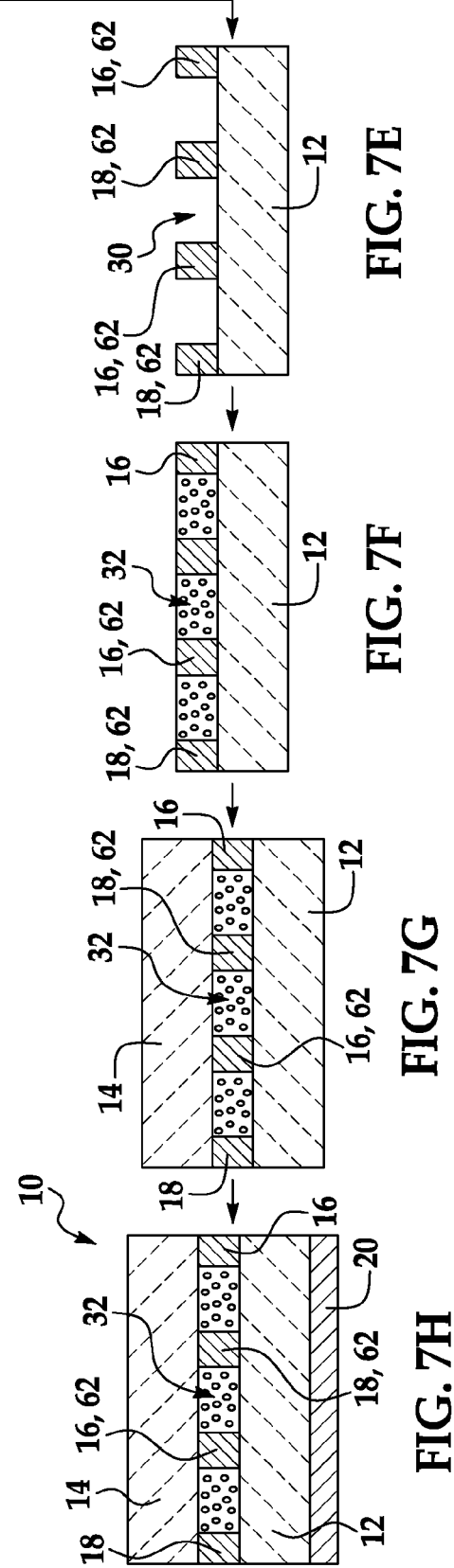

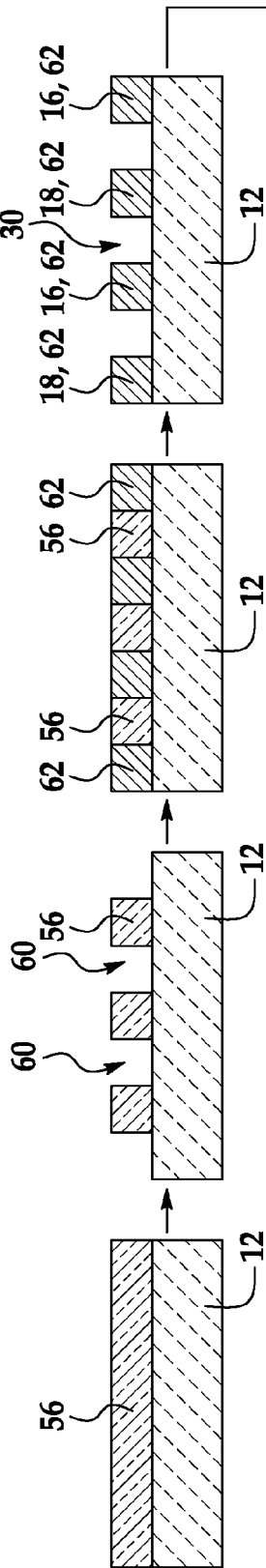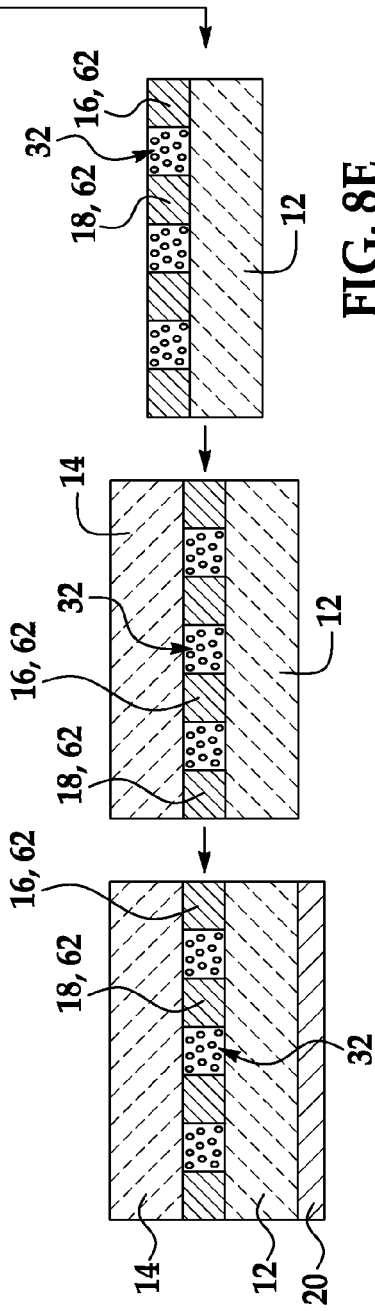

REFLECTIVE DISPLAYS

BACKGROUND

The present disclosure relates generally to reflective displays.

Displays may be reflective (i.e., ambient light is used to illuminate the display), emissive (i.e., light emitted from a light source of the display is used to illuminate the display), transmissive (i.e., light from a light source is modulated by a control switch), or transflective (i.e., uses ambient light and/or light from a light source of the display for illuminating the display). Some reflective displays are electrophoretic displays that, in theory, use electrophoresis alone to move charged particles in an electrophoretic medium under the influence of an external electric field. In reality, however, the architecture of some electrophoretic displays requires convective fluid flow and/or electrochemistry to move the charged particles.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 7A-7H are cross-sections that together schematically illustrate one example of a method for forming a reflective display; and FIGS. 8A-8G are cross-sections that together schematically illustrate another example of a method for forming a reflective display.

DETAILED DESCRIPTION

In the following detailed description, directional terminology, such as "top," "bottom," "front," "back," etc., is used with reference to the orientation of the Figure(s) being described. Components of examples of the present disclosure can be positioned in a number of different orientations, and thus the directional terminology is used for purposes of illustration and is in no way limiting. It is to be understood that other examples may be utilized and structural or logical changes may be made without departing from the scope of the present disclosure. As used herein, the term "over" is not limited to any particular orientation and can include above, below, next to, adjacent to, and/or on. In addition, the term "over" can encompass intervening components between a first component and a second component where the first component is "over" the second component. Also as used herein, the term "adjacent" is not limited to any particular orientation and can include above, below, next to, and/or on. In addition, the term "adjacent" can encompass intervening components between a first component and a second component where the first component is "adjacent" to the second component.

Some electrophoretic display architectures do enable charged particle movement using electrophoresis alone. However, these architectures may require specific fabrication processes, or may not allow for in-plane motion that is needed for full-color operation, or may result in highly non-uniform electric fields which deleteriously affect operation and optimization of the display.

Examples of the reflective display disclosed herein include pixel walls that are defined by one or more of the electrodes in the display. In some instances, this advantageously eliminates the need for separate pixels walls, which may otherwise be fabricated out of non-electrode materials and then aligned with the electrodes. The fabrication of the electrode pixel walls disclosed herein may be accomplished via roll-to-roll processing.

Figure 1A:
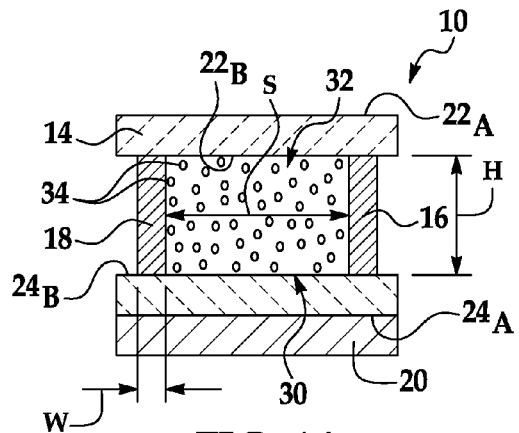
FIGS. 1A and 1C are schematic cross-sectional views of one example of a reflective display in a colored state and a clear state, respectively.
Figure 1B:
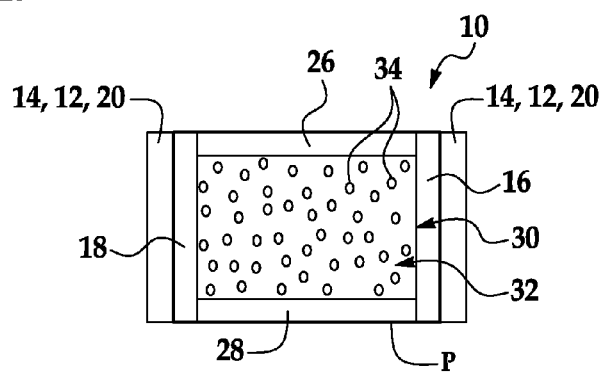
FIGS. 1B and 1D are schematic top views of the example of the reflective display shown in FIGS. 1A and 1C, respectively.
Figure 1C:
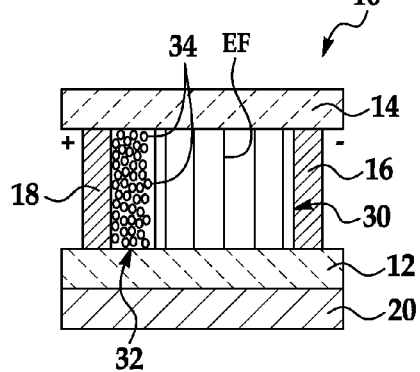
Figure 1D:
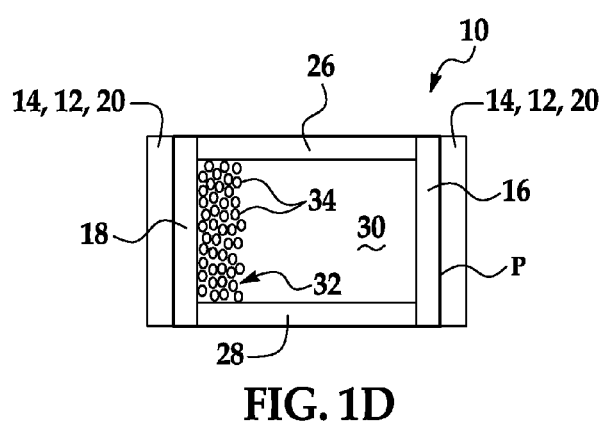

The geometry of the electrodes of the reflective displays disclosed herein is selected to create substantially uniform electric fields during operation of the display. As used herein, "substantially uniform electric fields" mean that the characteristic variation of the field (or one of its component) over the device area is much less (e.g., <10%) than the average value of the field or its respective component. Uniformity in the xy plane depends upon the electrode pattern. For example, the electric field of the structures shown in FIGS. 3A through 3D will be angle uniform (i.e., independent of the z coordinate and angular coordinate), but not radially uniform. For complete uniformity where the electric field is constant, the electrodes are parallel to one another, as shown in FIGS. 1C and 1D. The uniformity along the z direction is shown in FIG. 1C where the electric field lines are labeled EF. While several example geometries are provided herein, it is to be understood that any electrode geometry that enables the creation of the substantially uniform electric fields is considered to be suitable for the reflective displays disclosed herein.

The devices disclosed herein enable shutter functionality (i.e., switching between a colored state and a clear/transparent state) to be achieved via electrophoretic motion of charged pigment particles alone, without convection and/or electrochemistry. This is believed to reduce the operating voltage of the display, at least in part because the charged pigment particles follow the electric field lines. Without being bound to any theory, it is also believed that the electrode geometry and the resulting substantially uniform electric fields helps achieve desirable switching attributes, namely i) switching speed, ii) pigment mobility, iii) aperture ratio, iv) uniformity, v) low operating voltage, and vi) operation without a steady state electrical current. One or more of these attributes may extend the life of the display.

The electrodes disclosed herein may have any geometry that allows the pigment particles to clear the pixel when exposed to a particular bias. Examples of the geometry for individual pixels are shown and discussed further in reference to FIGS. 1A-1D, 2, and 3A-3D. Examples of the geometry for a plurality of pixels are shown and discussed further in reference to FIGS. 4-6. It is to be understood that materials and dimensions described in reference to one example may be applicable for other examples disclosed herein.

Referring now to FIGS. 1A through 1D, an example of the reflective display 10 is shown in the colored state (see FIGS. 1A and 1B) and in the clear state (see FIGS. 1C and 1D). This example of the reflective display 10 includes two transparent substrates 12, 14. Examples of suitable transparent substrate materials include non-conductive materials, such as chemically inert polymers (e.g., polyethylene terephthalate (PET), polyethylene naphthalate (PEN), polyether sulphone (PES), polycarbonate (PC), etc.), glass (rigid or flexible), or another suitable non-conductive optically clear/transparent material. The substrates 12, 14 may have any suitable thickness, which depends, at least in part, on the desirable overall thickness of the display 10. In one example, the substrate thickness ranges from about 50 µm to about 500 µm. It is to be understood, however, that the substrate may be thicker or thinner than the given range. Furthermore, the substrates 12, 14 may have any suitable area, which depends, at least in part, on the desirable overall size of the display 10. For small displays 10, the area of the substrates 12, 14 may be as small as 1 cm$^2$, which, for example, may be processed using photolithographic methods. For large displays (e.g., digital billboards), the substrates 12, 14 can be meters wide and multiple meters long, and processed on wide roll-to-roll tools. The substrate area may be anywhere in between these examples. The display 10 shown in FIGS. 1A through 1D includes a single pixel P (shown in bold in FIGS. 1B and 1D), but it is to be understood that a plurality of pixels P may be formed between the substrates 12, 14 (see, e.g., FIGS. 4-6).

One of the substrates (e.g., substrate 14) is positioned within the display 10 so that one of its surfaces $22_A$ receives ambient light prior to the other components of the display 10. The other of the substrates (e.g., substrate 12) is positioned such that one of its surfaces $24_A$ is adjacent a reflector 20. In one example, the substrate 12 is in direct contact with the reflector 20. Examples of suitable reflectors 20 include metals, such as aluminum or silver (structured and non-structured), titania filled papers, titania filled plastics, etc.

The substrates 12, 14 are separated from each other by the electrodes 16, 18. The electrodes 16, 18 are free-standing structures whose opposed ends are connected to one of the substrates 12, 14 (i.e., one end is connected to substrate 12 and the other end is connected to substrate 14). The electrodes 16, 18 may be connected to the substrates 12, 14 via an adhesive. Suitable adhesives include, for example, epoxy, acrylic based adhesives, UV-curable adhesives, or the like. Physical methods may also be used to connect the electrodes 16, 18 to the substrates 12, 14. One example of suitable physical method is partial melting of the substrates 12, 14.

The electrodes 16, 18 are formed of any conductive material, such as metals (e.g., aluminum, copper, gold, nickel, platinum, silver, tungsten, etc.). In one example, the electrodes 16, 18 are formed of a metal that is optically neutral (e.g., black), is stable (i.e., does not undergo discoloration), and absorbs a limited amount of molecular hydrogen. One example of such a metal is nickel. In one example, the electrodes 16, 18 are metal wires. Although individual electrodes 16, 18 are shown with rectangular cross-sections, electrodes 16, 18 may also have circular, elliptical, or more complex cross-sections. The electrodes 16, 18 may be fabricated to have a width W ranging from about 1 µm to about 100 µm. It is believed that the widths W within this range (and in particular the thinner widths) enhance the transparency and clear state of the individual pixel P and the overall display 10. The transparency is a function of the clear aperture, which is defined as the active area of the pixel not occupied by electrodes 16, 18 if the absorption through any substrate(s) 12, 14 of the display 10 is assumed to be negligible. In one example, the line width W of the electrodes 16, 18 can be a few microns or sub-microns to maximize the clear aperture such that the transparency of the display is 90% or better.

Additionally, each of the electrodes 16, 18 has a height H ranging from about 5 µm to about 50 µm. In one example, the height H of each electrode 16, 18 in the display 10 is about 30 µm. It is believed that these heights H result in a more saturated colored state. As a result, relatively small pigment loads may be used, which leads to effective compaction at one of the electrodes 16, 18. Effective compaction improves the clear aperture, and also allows the space s between the electrodes 16, 18 to be reduced. In an example, the space s between the electrodes 16, 18 ranges from about 100 µm to about 1000 µm. A smaller space s results in an increase in the switching speed and/or a decrease in the operating voltage. It is to be understood that the height H may vary from the given range (e.g., electrodes 16, 18 may be thicker than 50 µm), depending, at least in part, on the desirable overall size of the display 10.

Furthermore, the electrodes 16, 18 may be acquired in a usable state or may be fabricated using conventional techniques, such as photolithography or electron beam lithography, or by more advanced techniques, such as imprint lithography.

One example of how the electrodes 16, 18 are fabricated is discussed in reference to FIGS. 7 and 8. The geometry of the electrodes 16, 18 shown in FIGS. 1A through 1D is a parallel line geometry, where each electrode 16 is parallel to each other electrode 18. While two electrodes 16, 18 are shown, it is to be understood that any number of electrodes 16, 18 may be included in this geometry. It is to be further understood that at least one positive electrode and one negative electrode are utilized in the parallel line geometry. Each of the electrodes 16, 18 in the parallel line geometry forms one wall of the pixel P. As such, two walls of each pixel P in this example are electrodes 16, 18. It is to be understood that with this geometry, the other walls of this pixel P are non-electrode pixel walls. In the example shown in FIGS. 1B and 1D, the pixel P has a square or rectangular shape, and thus two non-electrode pixel walls 26, 28 are formed to enclose/seal the space 30 that is defined by the surfaces $22_B$ and $24_B$ of substrates 12, 14, the electrodes 16, 18 and the non-electrode pixel walls 26, 28. The non-electrode pixel walls 26, 28 may be formed of any non-conductive materials, such as a dielectric material, glass, etc. These walls 26, 28 may be defined in the substrate 12 or may be a material that is deposited between the electrodes 16, 18 and the substrates 12, 14. The non-conductive pixel walls 26, 28 serve the purpose of confining ink within a given pixel P, and thus the distance between walls 26 and 28 can be much larger than the distance between electrodes 16 and 18.

The parallel line geometry is scalable with respect to the desired thickness of the overall display 10.

An electrically addressable pigment dispersion 32 is introduced into the space 30. The electrically addressable pigment dispersion 32 includes a carrier fluid and charged pigments 34. The carrier fluid may be a polar fluid (e.g., water), a non-polar fluid (e.g., hydrocarbons, halogenated or partially halogenated hydrocarbons, and/or siloxanes), or an anisotropic fluid (e.g., liquid crystals). Some specific examples of non-polar carrier fluids include perchloroethylene, cyclohexane, dodecane, mineral oil, isoparaffinic fluids, cyclopentasiloxane, cyclohexasiloxane, cyclooctamethylsiloxane, and combinations thereof. The carrier fluid may also include surfactants such as salts, charging agents, stabilizers, and dispersants. It is to be understood that the carrier fluid may be any suitable medium for enabling fluidic motion of charged particles.

In one example, the pigments 34 are made up of a charged material that is able to hold a stable charge indefinitely so that repeated operation of the display 10 does not affect the charge on the pigments 34. It is to be understood that pigments 34 that have a finite ability to hold a stable charge may also be used in the examples disclosed herein, while they maintain their charge. Some examples of the pigments 34 have the property of changing the spectral composition of the incident light by absorbing and/or scattering certain portions of the visible spectrum. As a result, the pigments 34 appear colored, which provides a desired optical effect. Any colored pigment may be used, such as, red, magenta, yellow, green, blue, cyan, black, white, etc. The diameter of each of the pigments 34 generally ranges from about 10 nm to about 1 µm. The size of the pigment particles 34 used may also depend upon the refractive index of the material selected as the pigments 34.

The parallel line geometry shown in FIGS. 1A through 1D enables 1-dimensional flow of the pigment particles 34 between the two electrodes 16, 18. In the colored state (shown in FIGS. 1A and 1B), the pigments 34 are substantially uniformly distributed between the electrode 16 and the electrode 18. When a suitable bias is applied to the electrodes 16, 18 (illustrated by the + and − signs in FIGS. 1C and 1D), a substantially uniform electric field compacts the pigments 34 near one electrode (positive or negative) depending upon the polarity of the pigments 34. The compacted particles 34 correspond with the clear/transparent state of the pixel P. This state is shown in FIGS. 1C and 1D.

Figure 2:
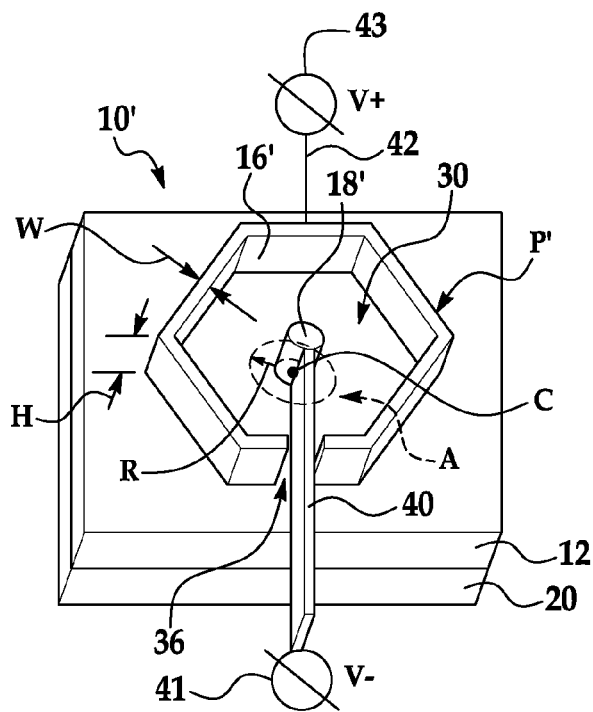
FIG. 2 is a perspective schematic view of another example of a reflective display with a top substrate removed for clarity and with electrical contacts shown schematically.
Figure 3A:
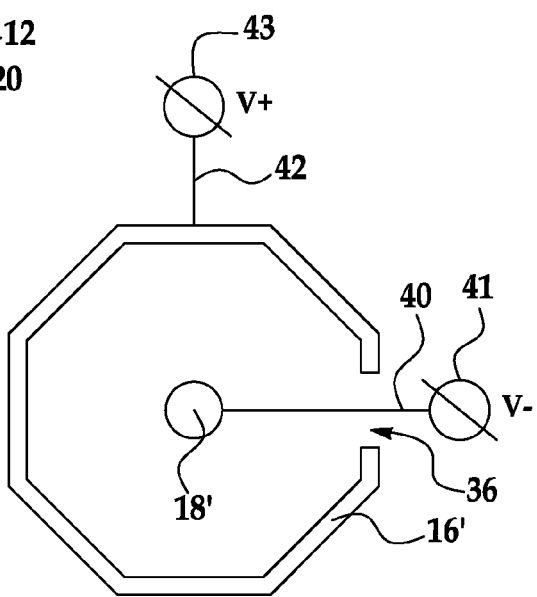
FIGS. 3A through 3D are schematic top views of different examples of geometries of first and second electrodes that can be used in examples of the reflective display disclosed herein, where electrical contacts are shown schematically.
Figure 3B:
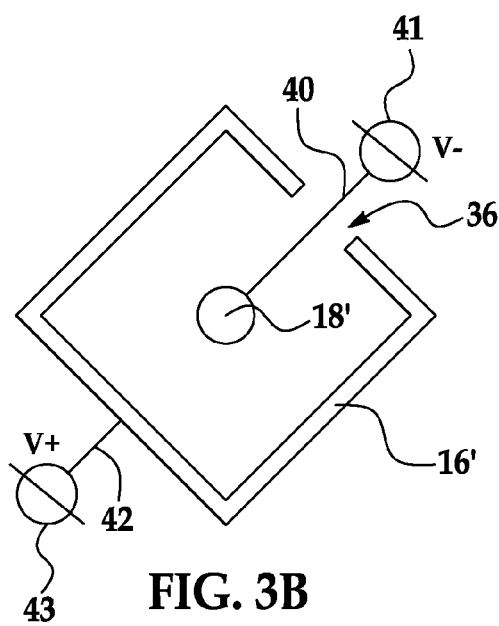
Figure 3C:
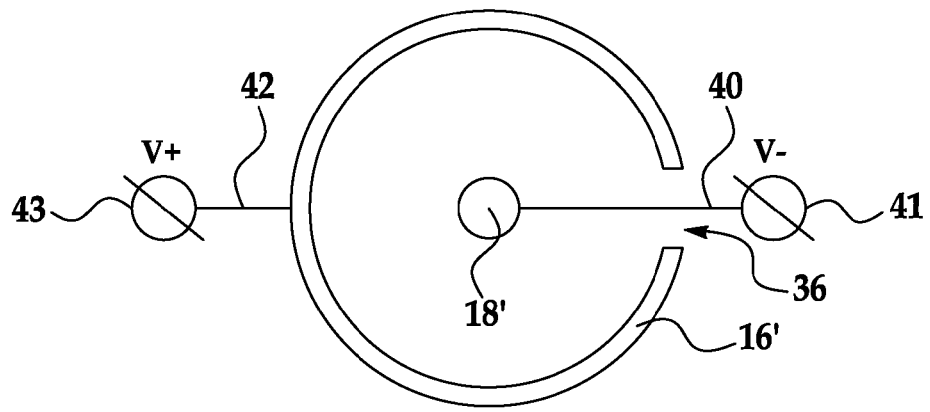
Figure 3D:
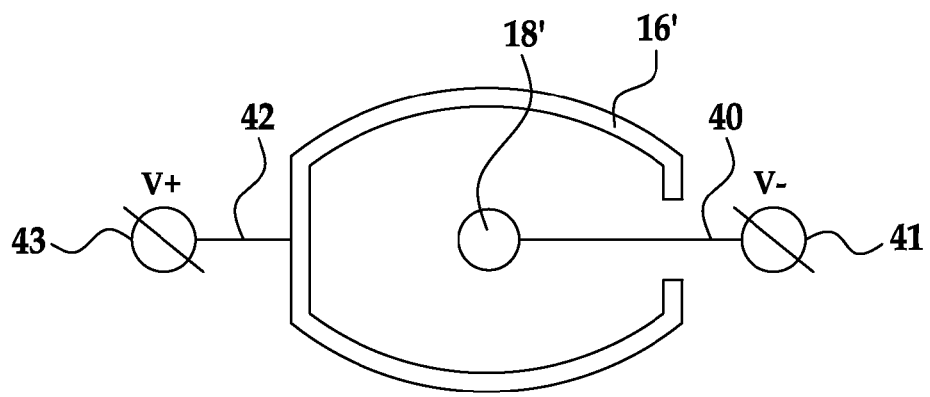

FIG. 2 illustrates a perspective view of another example of the display 10' with the top substrate 14 removed for clarity. The geometries of the electrodes 16', 18' together form an interpenetrated network that enables a substantially uniform electric field to be created when a bias is applied to the electrodes 16', 18', and that ensures substantial uniformity of the colored and clear states. In this example, the substantially uniform electric field is approximately independent of the z coordinate and the angular coordinate, which ensures that the pixel P' clears symmetrically. However, it is to be understood that the electric field in this example is non-uniform along the radius (i.e., a line connecting the center electrode 18' with the electrode 16'). In this example, the electric field along the radius is larger near the center electrode 18', and thus obtaining the clear state (or colored state) is non-uniform in time. Depending upon the polarity, switching within this pixel P' may occur fast and then slow, or vice versa.

In the example shown in FIG. 2, the geometry of the electrode 16' is a hexagon shape having an opening 36 defined in one of the sides of the hexagon. The material(s), height H, width W, and cross-section of the electrode 16' are substantially the same as previously described in reference to FIGS. 1A-1D. The hexagon shape of the electrode 16' may be perfectly symmetrical or may slightly deviate from being perfectly symmetrical (i.e., is substantially symmetrical). When discussing the symmetry of the electrode 16', it is to be understood that the opening 36 may not be taken into account. For example, the hexagon shape shown in FIG. 2 is considered to be substantially symmetrical because if the electrode material were present in the opening 36, the hexagon would be symmetrical. A substantially symmetrical hexagon has a shape that will coincide with itself upon rotation by 60 degrees around the central point with deviations from the original shape by less than 5% of the overall size of the hexagon.

The electrode 18' is positioned at a center area A of the electrode 16'. The center area A includes the center point C of the geometrical shape used for the electrode 16' and some predetermined radius R surrounding the center point C. It is to be understood that the predetermined radius R may be any suitable number that will result in a center area A that enables the substantially uniform electric field to be created when the electrode 18' is positioned within that area A. As such, the maximum radius R corresponds with the furthest point from the center point C at which the electrode 18' can be placed so that the electrodes 16', 18' still create a substantially uniform electric field when a bias is applied thereto. This predetermined radius R may vary depending, at least in part, upon the shape of the electrodes 16', 18'.

In the example shown in FIG. 2, the electrode 16' has a geometry that is different from the geometry of the electrode 18'. The geometry of the electrode 18' is substantially cylindrical. The substantially cylindrical electrode 18' may be a hollow cylinder or a solid cylinder. While a substantially cylindrical geometry is shown for the electrode 18', it is to be understood that other substantially symmetrical geometries are contemplated as being suitable for the electrode 18'. For example, the electrode 18' shown in FIG. 2 may have a substantially hexagonal shaped cross-section that matches the shape of the electrode 16'. Any geometry that will allow the substantially uniform electric field to be generated is acceptable. In one example, if the electrode 18' has a diameter that is less than 10% of the diameter of the electrode 16', the electrode 18' may have any desirable cross-section, such as square, hexagon, other polygon, circle, oval, etc.

Figure 4:
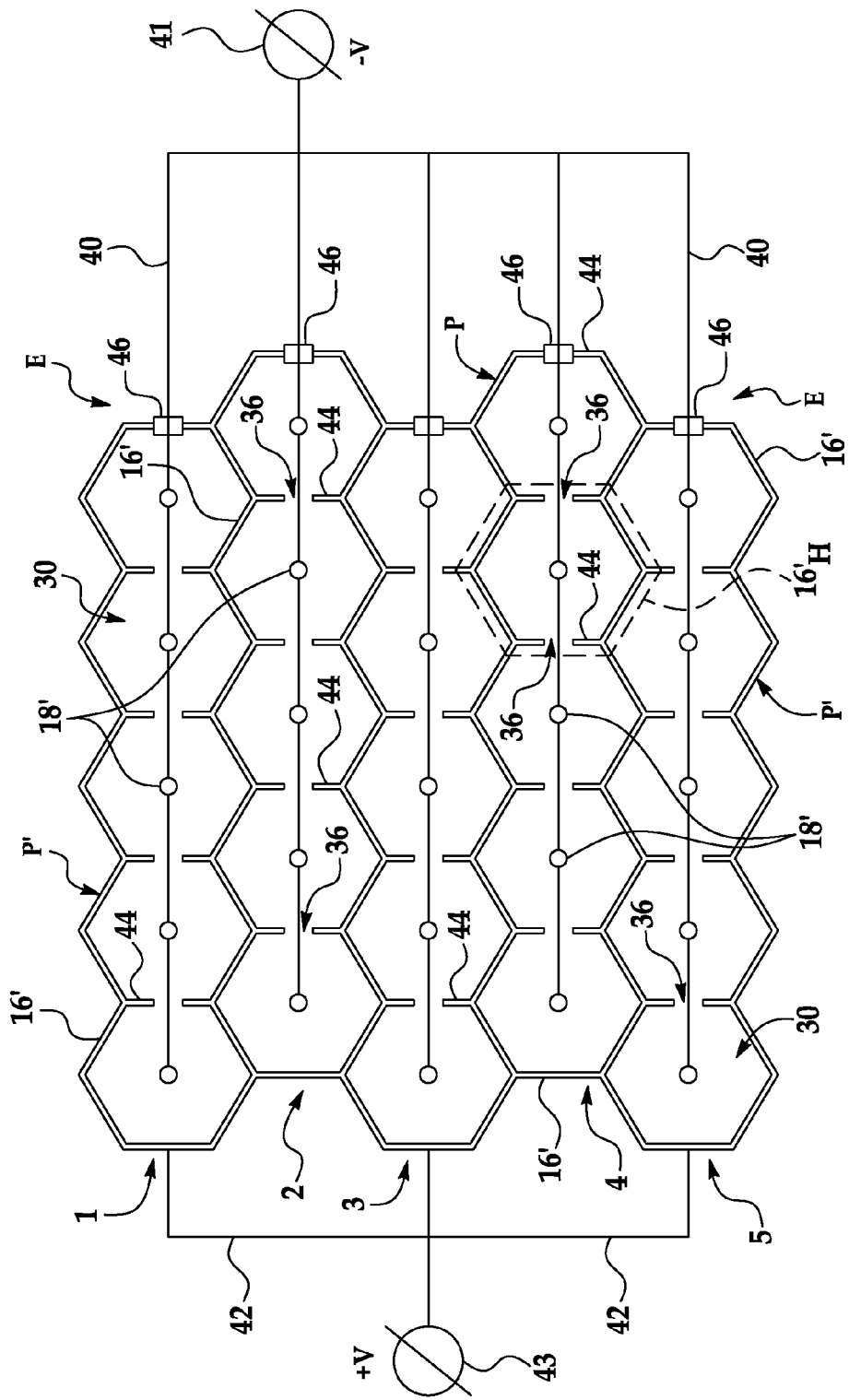
FIG. 4 is a schematic plan view of an example of a plurality of display pixels and circuitry electrically connecting electrodes of the display pixels.
Figure 5:
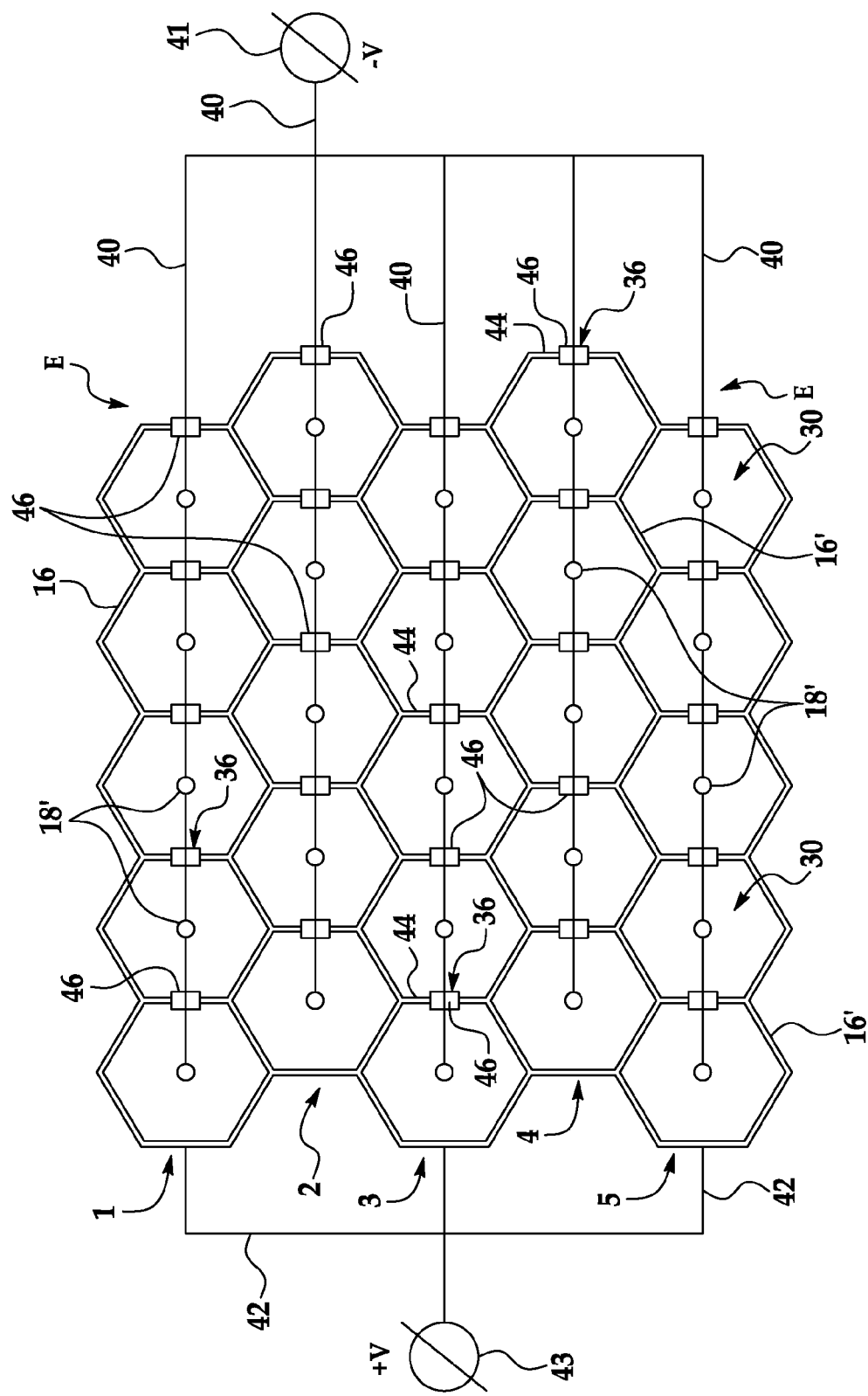
FIG. 5 is a schematic plan view of another example of a plurality of display pixels and circuitry electrically connecting electrodes of the display pixels.
Figure 6:
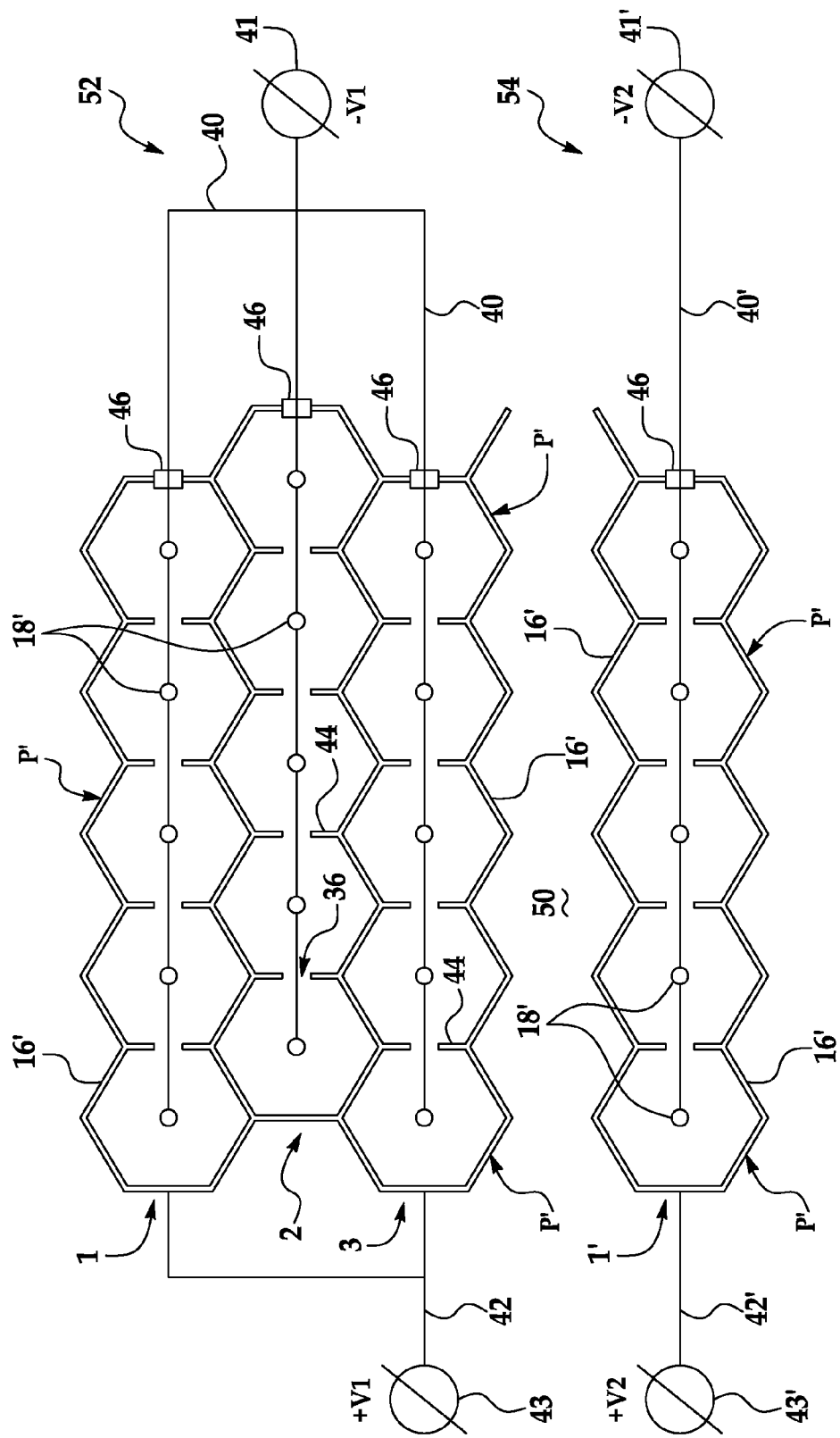
FIG. 6 is a schematic plan view of an example of two electrically isolated display segments, each of which includes a plurality of display pixels and electronic circuitry connecting electrodes of the display pixels.

In one example, the electrodes 16', 18' and substrates 12, 14 (the latter of which is not shown) make up one pixel P' of the display 10'. Examples with a plurality of pixels P' are shown in FIGS. 4-6.

The opening 36 is formed in the one side of the electrode 16' to enable addressing circuitry 40 to be operatively connected to the electrode 18'. The opening 36 may be a complete break in the electrode 16' (as shown) or may be formed in the one side such that some of the electrode material remains (e.g., the opening is a hole through the electrode material). The configuration of the opening 36 will depend upon the geometry of the addressing circuitry 40. For example, if the addressing circuitry 40 is a straight wall (as shown in FIG. 2) running through the opening 36, the opening 36 is a complete break in the electrode 16'. If however, the addressing circuitry 40 is a wire, the opening 36 may be a hole formed through the side of the electrode 16'. In this example, an electrically insulating material may be positioned around the addressing circuitry 40 in the hole in order to ensure that the addressing circuitry is electrically isolated from the electrode 16'.

While not shown in FIG. 2, it is to be understood that the electrically addressable pigment dispersion 32 may be introduced into the space 30 defined between the electrodes 16' and 18'. The opening 36 may be sealed with an insulating material (not shown in FIG. 2) in order to contain the electrically addressable pigment dispersion 32 within the pixel P'. The dot-to-hexagon geometry shown in FIG. 2 enables 1-dimensional radial flow of the pigment particles 34 between the two electrodes 16', 18'. In the colored state, the pigments 34 are substantially uniformly distributed between the electrode 16' and the electrode 18'. When a suitable bias is applied to the electrodes 16', 18' (using addressing circuitry 40 and voltage controller 41 connected to electrode 18', and addressing circuitry 42 and voltage controller 43 connected to electrode 16'), a substantially angularly uniform electric field and radially-symmetric flow of the pigments 34 compacts the pigments 34 near one electrode (positive or negative) depending upon the polarity of the pigments 34. In one example, the pigments 34 may compact around the walls of the hexagonal electrode 16', leaving the bulk of the space 30 clear. In another example, the pigments 34 may compact around the center electrode 18', leaving the bulk of the space 30 clear.

While a hexagon-shaped electrode 16' is shown in FIG. 2, it is to be understood that any substantially symmetrical shape may be used. Other suitable substantially symmetrical shapes include substantially symmetrical polygons (i.e., the shape that will coincide with itself upon a particular rotation (which depends upon the number of sides) around the central point with deviations from the original shape by less than 5% of the overall size of the polygon), circles, ovals, etc. The substantially symmetrical shapes may be stretched, or have curved or wavy line walls (as opposed to straight walls, e.g., a 6-sided flower shape), or be distorted in other ways that do not break the electrical continuity of the electrode(s) 16' or 18' and retain the substantially uniform electric fields when in operation. In some instances, circle and/or oval shaped electrodes 16' may be less desirable because an entire plane may not be covered with identical circles and/or ovals. Examples of some of these other suitable geometries are shown in FIGS. 3A through 3D. As illustrated, the opening 36 is formed in each of the electrodes 16' in order to operatively connect the electrode 18' to addressing circuitry 40.

FIGS. 4 and 5 illustrate examples of the geometry of the electrodes 16', 18' when the display 10' includes a plurality of pixels P'. The substrates 12, 14 and reflector 20 are not shown in these figures.

As illustrated in both of these figures, the electrode 16' is fabricated into a plurality of integrally formed hexagons. Each hexagon corresponds with a single pixel P'; and thus the electrode 16' defines the walls of each of the plurality of pixels P'. It is to be understood that the electrodes 16' may have other geometries (such as those described above) that are integrally formed together. Any geometry may be used that does not break the electrical continuity of the respective electrodes 16', 18' and that retains the substantial uniformity of the electric fields formed between the electrodes 16', 18'. One electrode 18' is positioned at the center area A of each hexagon. As such, one hexagon (formed of electrode 16') and one electrode 18' are part of a single pixel P'.

Each of the electrode 16' hexagons includes at least one opening 36 defined therein. In the example shown in FIGS. 4 and 5, the openings 36 are defined in the same side of each of the hexagons. For example, the opening 36 of each hexagon is formed in the side that is labeled 44. Since the hexagons are integrally formed with one another, some of the hexagons (e.g., one example of which is outlined in dashed lines and labeled $16'_H$ in FIG. 4) include two openings 36. The hexagons having two openings 36 share at least one of the openings 36 with an adjacent hexagon. For example, when looking down on FIG. 4, the hexagon $16'_H$ shares its opening 36 with the hexagon to its immediate right, and the hexagon that is immediately left of the hexagon $16'_H$ shares its opening 36 with hexagon $16'_H$. The openings 36 are formed so that the addressing circuitry 40 can be operatively connected to each of the electrodes 18'. It is to be understood that the openings 36 may be configured in other desirable positions which depend, at least in part, upon the configuration of the addressing circuitry 40 used.

It is to be understood that any or all of the openings 36 may be sealed. In the example of FIG. 4, the openings 36 of the hexagons positioned at an end E of each row 1, 2, 3, 4, 5 of pixels P' are sealed. In this example, the electrically addressable pigment dispersion 32 introduced into the pixels P' of the respective rows 1, 2, 3, 4, 5 may flow through any of the pixels P' in the respective rows 1, 2, 3, 4, 5. For example, the electrically addressable pigment dispersion 32 introduced into the pixels P' of row 1 may move to any of the row 1 pixels P'. In the example of FIG. 5, the openings 36 of each of the hexagons in the plurality are sealed. In this example, each pixel P' is fluidly isolated from each other pixel P'. As such, the electrically addressable pigment dispersion 32 introduced into one pixel P' cannot move to any of the other pixels P'. While two examples of the sealed openings 36 are shown in FIGS. 4 and 5, it is to be understood that seals 46 may be placed at any desirable openings 36. For example, seals 46 may be placed at every other hexagon so that two pixels P' are fluidly connected to each other, but are fluidly isolated from the remainder of the pixels P'. Seals 46 are generally placed at least at the openings 36 at the end E of the plurality so that the electrically addressable pigment dispersion 32 is contained within the plurality.

In any of the examples disclosed herein, the pixels P' may have the same color or a different color ink 32 introduced therein. When in fluid communication (i.e., seal 46 placed at an end of a row), adjacent pixels P' have the same color ink 32 introduced therein. However, when the pixels P' are fluidly isolated from one another (i.e., seal 46 placed between adjacent pixels P'), any color may be introduced into any pixel P'. In the example shown in FIG. 4, each of the rows 1, 2, 3, 4, 5 may be filled with different colors. In the example shown in FIG. 5, each of the pixels P' may be filled with the same color or a different color. In the example shown in FIG. 6, the first and second pluralities 52, 54 may be filled with different colors, or each of the rows 1, 2, 3, 1' may be filled with different colors.

When a plurality of pixels P' are activated together, it may be desirable to fill each pixel P' with the same color. As one example, the pixels P' of the structures shown in FIGS. 4 and 5 may all be filled with the same single color. As another example, the pixels P' of the first plurality 52 in FIG. 6 may be filled with one color and the pixels P' of the second plurality 54 may be filled with a different color, at least in part because the two pluralities 52, 54 are activated independently of one another. In some instances however, it may be beneficial to create a plurality of pixels P' with complex colors by blending just a few primary colors. For example, if a gray-to-clear shutter is desirable, it may be suitable to fill the plurality of pixels P' with a well-developed black ink and a well-developed white ink in alternating pixels P' (i.e., black/white/black/white/etc.).

The seals 46 may be formed of any electrically insulating material that will form a fluid (e.g., ink) barrier at the opening (s) 36. An electrically insulating material is desired for the seal(s) 46 so that the electrodes 16' and 18' remain electrically disconnected. In one example, the seal(s) 46 is/are formed of an electroplated or anodized dielectric. For example, electrophoretic deposition may be used to deposit colloidal dielectrics or anodic oxidation may be used to form an oxide. In some examples, the seal(s) 46 is/are formed of aluminum oxide when the electrodes 16', 18' are formed of aluminum, the seal(s) 46 is/are formed of tantalum oxide when the electrodes 16', 18' are formed of tantalum, and the seal(s) 46 is/are formed of colloidal ceramics when the electrodes 16', 18' are formed of any conductive material.

The electrode 16' is also operably and electrically connected to addressing circuitry 42. As illustrated in FIGS. 4 and 5, the circuitries 40, 42 are configured so that each of the pixels P' is operated by the circuitries 40, 42; the circuitry 42 controlling the electrode 16' and the circuitry 40 controlling the electrodes 18'. The circuitry 40 includes wires that electrically connect each of the electrodes 18' to a single voltage controller 41. The circuitry 42 includes wires that electrically connect each the electrodes 16' to a single voltage controller 43. This may be particularly advantageous because all of the electrodes 16' and 18' may be controlled by the respective controller 41, 43. While not shown, it is to be understood that external circuitry (e.g., transistors, drivers, etc.) may be used to set the voltages. When a voltage bias is applied to the electrodes 16' and 18', the charged particles 34 (not shown in FIGS. 4 and 5) will move adjacent to the hexagon walls of the electrode 16' or the electrodes 18', depending upon the polarity of the particles 34. It is to be understood that all of the pixels P' are activated collectively in the examples shown in FIGS. 4 and 5.

Referring now to FIG. 6, another example of a plurality of pixels P' is depicted (note that the substrates 12, 14 and reflector 20 are again not shown, but each of the pluralities 52, 54 is formed on the same substrate 12). In this example, two electrically isolated pluralities 52, 54 are included. The first plurality 52 includes three rows 1, 2, 3 of pixels P' that are electrically addressed via circuitry 40, 42 and controllers 41, 43. The second plurality 54 includes a single row 1' that is electrically addressed via circuitry 40', 42' and controllers 41', 43'. The circuitry 40, 42 is electrically disconnected from the circuitry 40', 42' so that the pluralities 52, 54 can be addressed separately. The pixels P' of each plurality 52, 54 may be configured in any desirable manner as described herein. Furthermore, the respective pluralities 52, 54 may include as many number of pixels P' as is desired, where the pixels P' in any row 1, 2, 3, 4, 5, 1' are fluidly connected or isolated as previously described.

The space 50 between the two pluralities 52, 54 remains transparent, at least in part because electrically addressable pigment dispersion 32 is not introduced into this space 50 and because the space 50 is not electrically connected to either of the pluralities 52, 54.

Referring now to FIGS. 7A through 7I, two examples of the method for forming the reflective display 10, 10' are depicted. One example is shown in FIGS. 7A-7E and 7G-7I, and the other example is shown in FIGS. 7A-7C and 7F-7I. While two examples are shown, it is to be understood that the electrodes 16, 16', 18, 18' of the displays 10, 10' may be formed via other methods, such as photolithography. The examples disclosed herein may advantageously be implemented with roll-to-roll processing. The materials for the electrodes 16, 16', 18, 18' and the substrates 12, 14 for use in these examples of the method have been previously discussed and thus will not be repeated here.

Referring now to FIG. 7A, an embossable material 56 is deposited on a conductive substrate 58. In one example, the embossable material 56 completely covers the surface of the conductive substrate 58. Embossable materials 56 may have multi-component formulations and, in some instances, are complex. In one example, the embossable material is a polymer with one or more additives, such as photoinitiators, dilutors, etc. Some embossable materials are UV curable (e.g., solidification occurs under UV exposure) and others are thermally curable (e.g., liquid at elevated temperatures and solid lower temperatures (e.g., room temperature)). The height/thickness of the embossable material 56 will depend, at least in part, on the desired height H for the electrodes 16, 16', 18, 18'. The embossable material 56 is ultimately used as a pattern for the electrodes 16, 16', 18, 18' so the height/thickness of the embossable material 56 is deposited to at least the desired height of the electrodes 16, 16', 18, 18'.

As shown in FIG. 7B, the embossable material 56 is embossed to form recesses 60. Embossing involves physically squeezing portions of the embossable material 58 to form the recesses 60 in a desired pattern. The pattern of the recesses 60 defines the pattern/geometry of the electrodes 16, 16', 18, 18'. As such, the recess pattern may be the parallel line geometry, the dot and hexagon geometry, or any other geometry that will form the desirable geometry of the electrodes 16, 16', 18, 18'.

In FIG. 7C, the material 62 that will form the electrodes 16, 16', 18, 18' is deposited into the recesses 60. As illustrated, the recesses 60 are completely filled with the material 62. In other instances, the material 62 may not completely fill the recesses 60. Since the material 62 forms the electrodes 16, 16', 18, 18', the material 62 may be any of the materials set forth hereinabove for the electrodes 16, 16', 18, 18'. This material 62 may be deposited via electroplating. In this example of the method, after the material 62 is deposited, both the material 62 and the embossable material 56 that remain are transferred to the transparent substrate 12. An adhesive may be deposited on the materials 56, 62 and/or on the substrate 12, and then the substrate 12 may be placed into contact with the materials 56, 62. The materials 56, 62 will transfer to the substrate 12 and the conductive substrate 58 can be peeled away. This transfer process may be a roll-to-roll process. For example, as the process is performed, adhesive may be constantly dispersed and the formed structure (12 adhered to 56 and 62) is constantly peeled away from the original substrate 58.

After being transferred, the embossable material 56 is removed, as shown in FIG. 7E. FIG. 7E illustrates the substrate 12 from FIG. 7D rotated 180° and having the embossable material 56 removed therefrom. A selective etching process may be used to remove the embossable material 56 without deleteriously affecting the material 62. As such, in one example, no embossable material 56 remains in the display 10 (or 10'). Since the embossable material 56 is removed, any negative issues related to the stability of the embossable material 56 do not affect the display 10 (or 10'). Once the embossable material 56 is removed, a network of conductive electrodes 16, 18 (or 16', 18') remains on the substrate 12.

While not shown in the FIG. 7 series, any openings may be filled, for example, to form non-conductive walls 26, 28 or seal(s) 46. Processes such as photolithography, anodic oxidation, electrophoretic deposition, or the like may be used to form the non-conductive walls 26, 28 or seal(s) 46. After the space(s) 30 of individual pixel P, P' is/are formed, the electrically addressable pigment dispersion 32 may be introduced therein, as shown at FIG. 7F. Introduction of the electrically addressable pigment dispersion 32 may be accomplished via digital instruments, such as inkjet printers. Inkjet printing may be particularly desirable when multiple colors are introduced into the pixels P, P'. Since the examples disclosed herein are blanket shutters, large areas can also be filled with the electrically addressable pigment dispersion 32 using syringe-like dispensers. In some instances, excess electrically addressable pigment dispersion 32 may be squeezed out when the other substrate (e.g., substrate 14) is adhered.

An adhesive may then be applied to the electrodes 16, 18 (or 16', 18') and the other substrate 14 may be adhered thereto, thereby sealing the electrically addressable pigment dispersion 32 within the space 30. This is shown in FIG. 7G.

As shown in FIG. 7H, the reflector 20 may then be adhered to either the substrate 12 or the substrate 14, depending upon the desired configuration of the display 10.

Another example of the method is shown in FIGS. 8A through 8G. This example of the method involves electroless deposition and does not involve the transfer process shown in FIGS. 7C and 7D. In this example, the initial substrate is the non-conducting substrate 12, and the embossable material 56 is deposited thereon (see FIG. 8A). This example of the method includes forming the recesses 60 in material 56, as shown in FIG. 8B and as previously described in reference to FIG. 7B. In this example, an electroless process is used to seed the material 62, and then the material 62 is electroplated to the desired thickness, as shown in FIG. 8C. As shown in FIG. 8D, the embossable material 56 is then removed using techniques previously described in reference to FIG. 7E. The removal of the embossable material 56 creates the spaces 30 between electrodes 16, 18 (formed of material 62).

This example of the method continues with forming non-conductive walls 26, 28, or seal(s) 46, filling the space 30 between the electrodes 16, 18 with the electrically addressable pigment dispersion 32 (shown in FIG. 8E and described in reference to FIG. 7F), adhering the substrate 14 (shown in FIG. 8F and described in reference to FIG. 7G), and adhering the reflector 20 (shown in FIG. 8G and described in reference to FIG. 7H).

It is to be understood that the various adhesives that are used throughout the examples of the method are suitable for adhering, for example, metal (e.g., the electrodes 16, 16', 18, 18' and reflector 20) to plastic, glass, etc. (e.g., the substrates 12, 14). Such adhesives may be optically transparent. However, it is to be understood that if the adhesive covers the top of metal lines (e.g., electrodes 16, 16', 18, 18') alone, such adhesives may not be optically transparent at least in part because the electrodes 16, 18, 16', 18' themselves may be opaque.

It is to be understood that the ranges provided herein include the stated range and any value or sub-range within the stated range. For example, a size ranging from about 1 nm to about 1 μm should be interpreted to include not only the explicitly recited amount limits of about 1 nm to about 1 μm, but also to include individual amounts, such as 10 nm, 50 nm, 220 nm, etc., and sub-ranges, such as 50 nm to 500 nm, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:

1. A reflective display, comprising:
   a first transparent substrate;
   a second transparent substrate;
   first and second electrodes connected to each of the first and second transparent substrates, and defining a space between the first and second transparent substrates, the first electrode defining a wall of a pixel of the reflective display and the second electrode being positioned at a center area of the first electrode;
   a geometry of the first and second electrodes to create a substantially uniform electric field when a voltage is applied to the first and second electrodes, the geometry of the first electrode being a substantially symmetrical shape having an opening in one side, and the geometry of the second electrode having a cross-section shape selected from squares, substantially symmetrical polygons, circles, and ovals; and
   an electrically addressable ink in the space between the first and second transparent substrates.

2. The reflective display as defined in claim 1 wherein the geometry of the first electrode is a hexagon with the opening in one side of the hexagon, and wherein the geometry of the second electrode is a cylinder that is positioned at the center area of the hexagon.

3. The reflective display as defined in claim 1 wherein the electrically addressable ink is an electrically addressable pigment dispersion.

4. The reflective display as defined in claim 1, further comprising a reflector directly adjacent to one of the first transparent substrate or the second transparent substrate.

5. The reflective display as defined in claim 1 wherein the display includes a plurality of pixels, and wherein the geometry of the first electrode defines an outer wall of each of the plurality of pixels.

6. The reflective display as defined in claim 5 wherein:
   the geometry of the first electrode includes a plurality of the substantially symmetrical shapes, each of the substantially symmetrical shapes having the opening in at least one side and each side of each of the substantially symmetrical shapes defines a portion of the outer wall;
   the display includes a plurality of the second electrodes, each one of the plurality of second electrodes being positioned at the center area of a respective one of the plurality of substantially symmetrical shapes; and
   the geometry of each of the second electrodes has a cross-section shape selected from squares, substantially symmetrical polygons, circles, and ovals.

7. The reflective display as defined in claim 6, further comprising addressing circuitry electrically connecting each of the plurality of second electrodes.

8. The reflective display as defined in claim 6, further comprising a dielectric barrier positioned in each of the openings of the substantially symmetrical shapes.

9. The reflective display as defined in claim 6, further comprising a dielectric barrier positioned in the opening of at least one of the substantially symmetrical shapes located at an end of the plurality of pixels.

10. The reflective display as defined in claim 5, further comprising:
    a second plurality of pixels that is electrically disconnected from the plurality of pixels;
    a third electrode having a geometry that defines an outer wall of each of the second plurality of pixels; and
    a fourth electrode positioned at a center area of a respective one of the second plurality of pixels.

11. The reflective display as defined in claim 10 wherein:
    the geometry of the third electrode includes a plurality of substantially symmetrical shapes, each of the substantially symmetrical shapes having an opening in a side; and
    a geometry of each of the fourth electrodes has a cross-section shape selected from squares, substantially symmetrical polygons, circles, and ovals.

12. The reflective display as defined in claim 11, further comprising addressing circuitry electrically connecting each of the fourth electrodes.

13. The reflective display as defined in claim 1 wherein the substantially symmetrical shape having the opening in one side is a substantially symmetrical polygon, a substantially symmetrical circle, or a substantially symmetrical oval.

14. A method for making a reflective display, comprising:
    establishing an embossable material on a conductive substrate;
    embossing the embossable material to form recesses that expose the conductive substrate, the recesses defining a geometry of a subsequently formed first electrode and a geometry of a subsequently formed second electrode, the geometry of the first and second electrodes to create a substantially uniform electric field when a voltage is applied to the first and second electrodes, the geometry of the first electrode being a substantially symmetrical shape having an opening in one side, and the geometry of the second electrode having a cross-section shape selected from squares, substantially symmetrical polygons, circles, and ovals;

depositing a conductive material into the recesses, thereby forming the first electrode and the second electrode, the first electrode defining a wall of a pixel of the reflective display and the second electrode being positioned at a center area of the first electrode;

transferring at least the first and second electrodes to a first transparent substrate;

filling a space between the first and second electrodes with an electrically addressable ink; and adhering a second transparent substrate to the first and second electrodes, thereby sealing the space between the first and second electrodes.

15. The method as defined in claim 14 wherein the transferring includes transferring both the first and second electrodes and the embossable material to the first transparent substrate, and wherein prior to the filling, the method further comprises removing the embossable material.

16. The method as defined in claim 14 wherein the geometry of the first electrode includes a plurality of substantially symmetrical polygons and the geometry of the second electrode includes a cylinder positioned at the center area of each of the plurality of substantially symmetrical polygons, and wherein the method further comprises sealing the opening in at least one of the plurality of substantially symmetrical polygons.

17. A method for making a reflective display, comprising:

establishing an embossable material on a first transparent substrate that is non-conductive;

embossing the embossable material to form recesses that expose the conductive substrate, the recesses defining a geometry of a subsequently formed first electrode and a geometry of a subsequently formed second electrode, the geometry of the first and second electrodes to create a substantially uniform electric field when a voltage is applied to the first and second electrodes, the geometry of the first electrode being a substantially symmetrical shape having an opening in one side, and the geometry of the second electrode having a cross-section shape selected from squares, substantially symmetrical polygons, circles, and ovals;

using electroless deposition to deposit a conductive material into the recesses, thereby forming the first electrode and the second electrode, the first electrode defining a wall of a pixel of the reflective display and the second electrode being positioned at a center area of the first electrode;

removing the embossable material to create a space between the first and second electrodes;

filling the space with an electrically addressable ink; and adhering a second transparent substrate to the first and second electrodes, thereby sealing the space between the first and second electrodes.

18. The method as defined in claim 17 further comprising forming a fluid barrier in the opening.

* * * * *